United States Patent [19]

Nishino et al.

[11] Patent Number: 4,728,081
[45] Date of Patent: Mar. 1, 1988

[54] INCINERATING AND MELTING APPARATUS

[75] Inventors: Haruo Nishino, Kawasaki; Yoshiharu Tanaka, Houya; Yoshiharu Matsui, Yokosuka; Madoka Kawakami, Yokohama, all of Japan

[73] Assignee: Chiyoda Chemical Engineering & Construction Co., Ltd., Kanagawa, Japan

[21] Appl. No.: 812,654

[22] Filed: Dec. 23, 1985

[30] Foreign Application Priority Data

Dec. 24, 1984 [JP] Japan ................................ 59-270792
Dec. 24, 1984 [JP] Japan ................................ 59-270793
Nov. 8, 1985 [JP] Japan ................................ 60-248956

[51] Int. Cl.$^4$ ............................................. C21C 5/38
[52] U.S. Cl. .................................... 266/158; 110/237; 110/246; 110/256; 110/259; 266/173; 266/248; 432/105
[58] Field of Search ....................... 266/158, 173, 248; 110/237, 246, 255, 256, 259; 432/103, 105

[56] References Cited

U.S. PATENT DOCUMENTS 3,861,335  1/1975  Przewalski .......................... 110/246
4,245,821  1/1981  Kappell et al. ...................... 266/173

Primary Examiner—John P. Sheehan
Assistant Examiner—Robert L. McDowell
Attorney, Agent, or Firm—Armstrong, Nikaido, Marmelstein & Kubovcik

[57] ABSTRACT

Disclosed is an incinerating and melting apparatus for processing materials such as organic matters, inorganic matters and metals, which apparatus has a cylindrical or polygonal horizontal furnace body provided with a material charging port and a melt discharge port formed in the wall thereof, wherein a burner is mounted in the inner surface of the furnace body, the furnace body is oscillatorily rotatable in one and the other directions about its axis, and a melt receiver is detachably secured to the melt discharge port, or wherein the furnace body is fitted in a hood into which the melt discharge port opens and the melt receiver is detachably secured to the hood.

13 Claims, 16 Drawing Figures

FIG.3
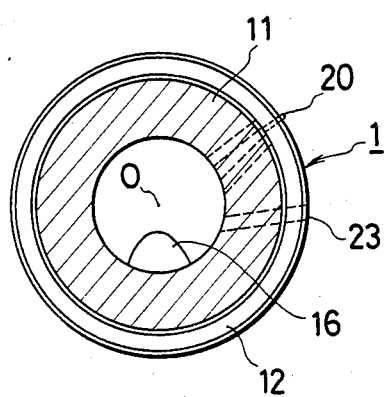
FIG.4
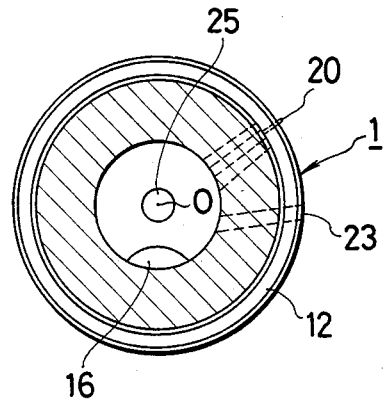
FIG.5-A
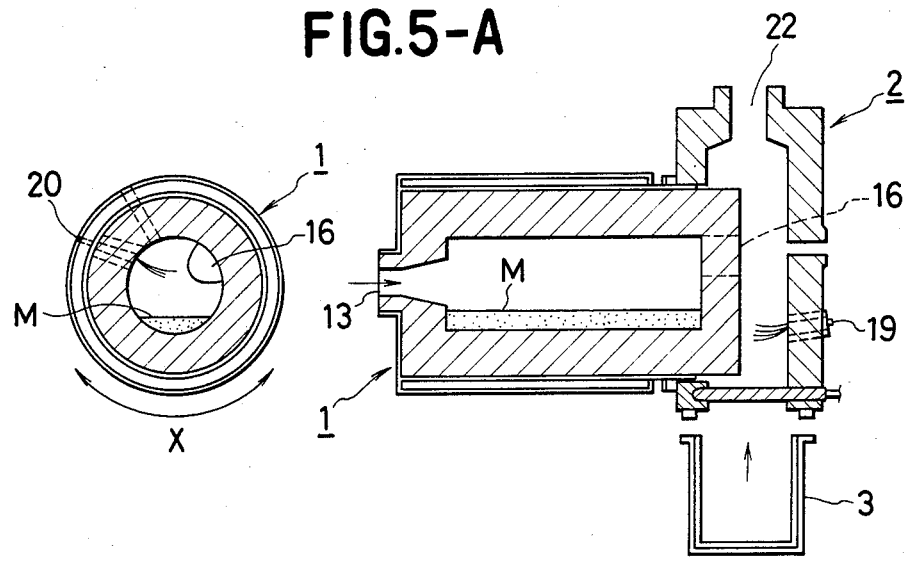

FIG.5-B
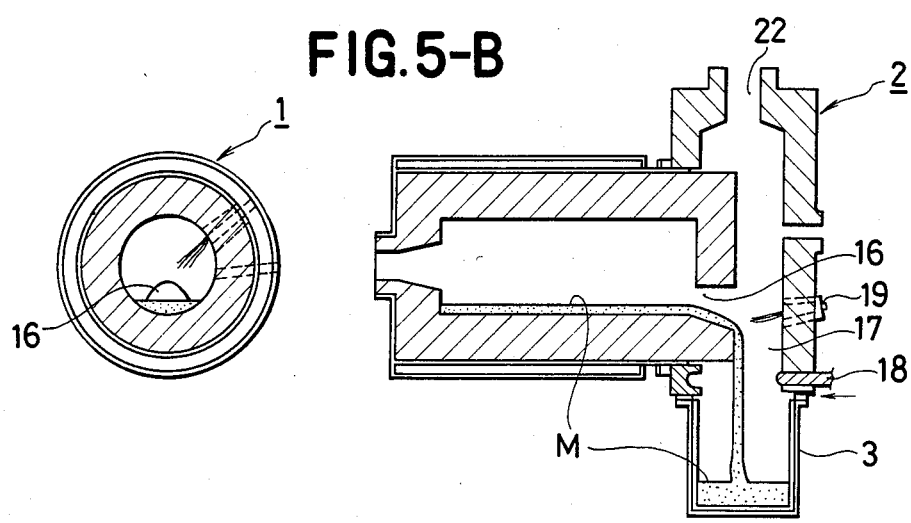
FIG.5-C
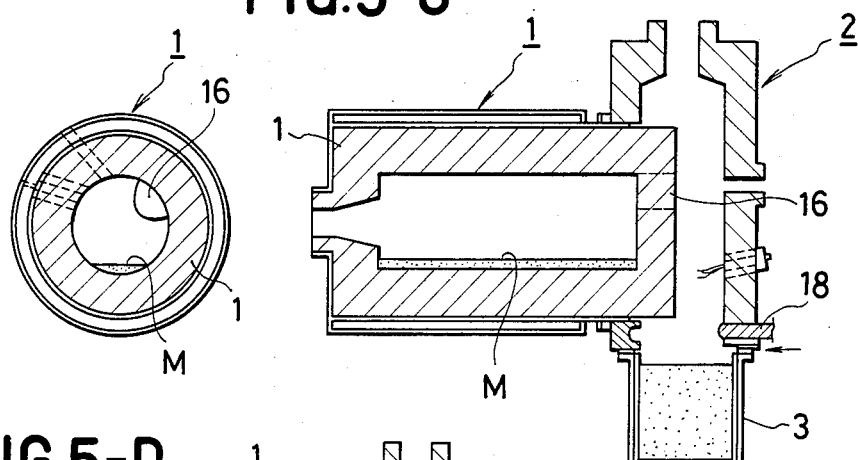
FIG.5-D
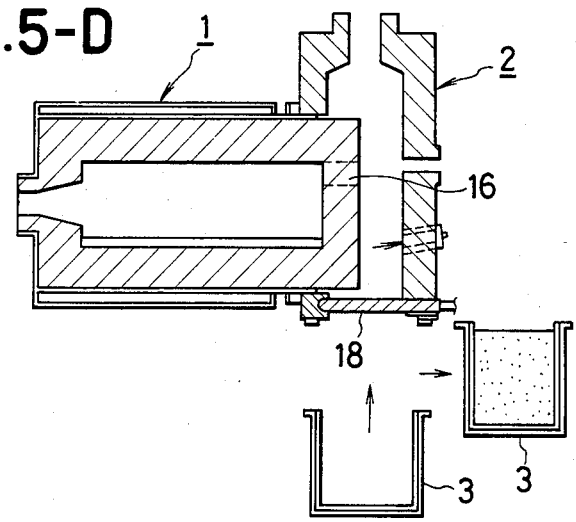

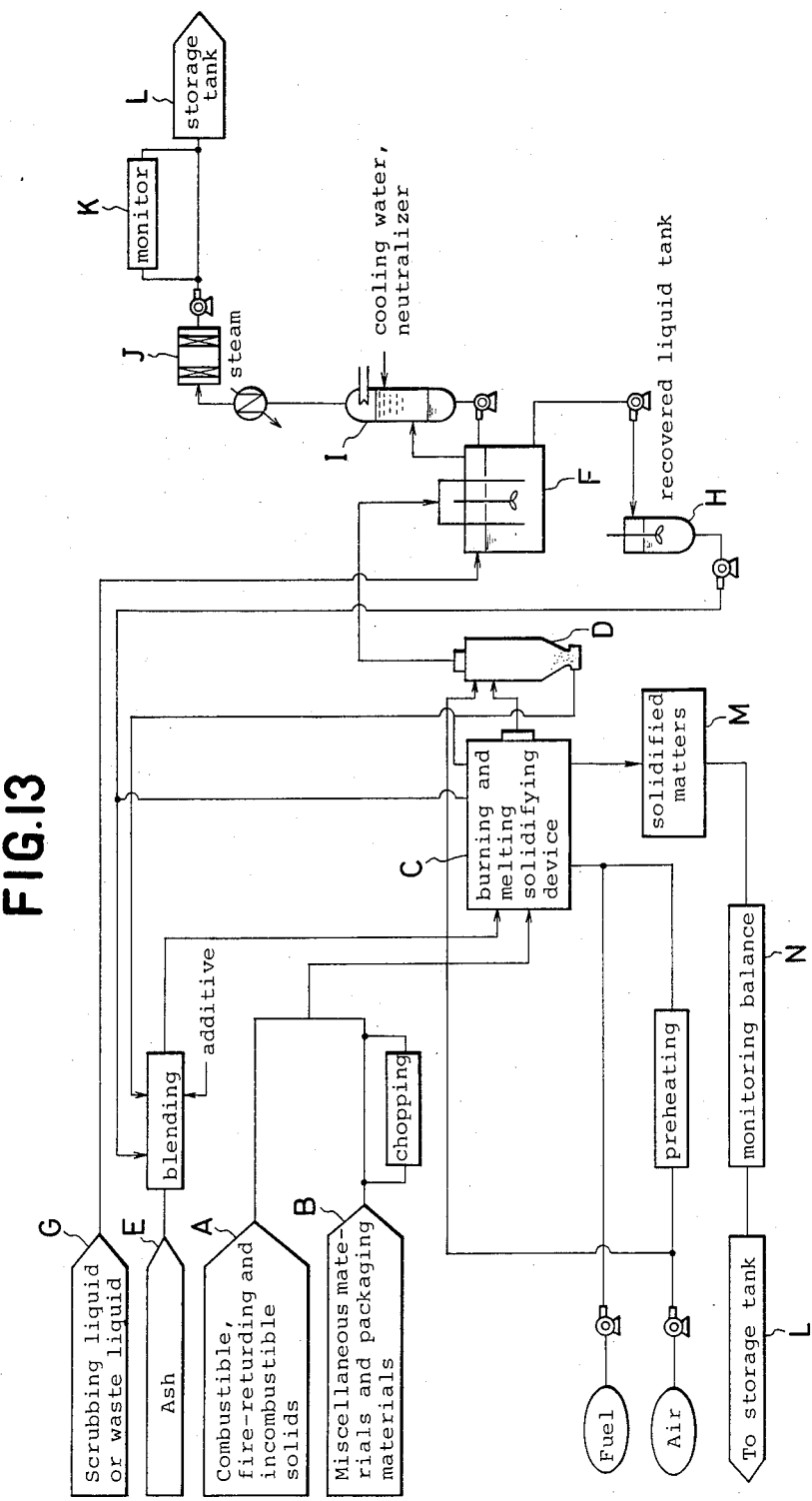

INCINERATING AND MELTING APPARATUS

BACKGROUND

The present invention relates to apparatus for incinerating and melting materials such as organic matters, inorganic matters and metals.

Various apparatus for incinerating and melting materials such as organic matters, inorganic matters and metals (hereinafter referred to as "materials to be treated" or, more simply, as "materials") are known, including such as metal melting furnaces, sewage slurry melting furnaces, apparatus for melting garbage and industrial wastes, and apparatus for burning, melting and solidifying radioactive wastes from nuclear power plants.

These apparatus are generally required to meet the following three requirements:

(1) Easiness of the works for pouring the melt and for stopping the pouring, and free adjustment of the period of stay of materials to be treated in the furnace. These are necessary for easy and safe pouring and stopping of pouring of holt melt, and also for free start and stop of the pouring of melt regardless of the amount of the melt in the furnace, so as to allow optimization of the heating and mixing time, i.e., the period of stay of the melt, in accordance with the nature of materials to be treated.

(2) Smooth discharge of the melt from the furnace without fail. Any blockage of the melt discharge port by locally solidified or unmolten materials has to be avoided strictly.

(3) A series of disposing processes including the burning, melting, pouring and cooling has to be completed in an airtight atmosphere. This is necessary in order to prevent scattering of fume and dust freed from the materials to be treated when they are molten, and also for preventing transfer of any noxious substances freed from the material when there is a risk of release of such substances.

Although several types of incinerating and melting apparatus have been used, these known apparatus have disadvantages as follows:

A. Apparatus of the type which has a discharge port in the bottom thereof and in which the start and stop of the melt is controlled by means of a slide gate adapted to open and close the discharge port.

This type of apparatus tends to suffer from blockage of the discharge portion, and requires a frequent protective maintenance due to rapid wear of the slide gate and associated parts.

B. Apparatus of the type in which the melt discharge port is provided in one side or bottom thereof, the closing of the port being effected by solidifying the melt by forcible cooling of the region near the discharge port, the start of discharge being effected by locally heating the region around the discharge port so as to melt the solidified materials.

This apparatus requires a huge equipment and complicated operation for the start and stop of pouring.

C. Apparatus of the type in which the melt is discharged by overflow through an overflow port formed in one side thereof.

This type of apparatus tends to experience blockage of the overflow port, and requires a careful control of the material supply rate, as well as the nature of the melt, in order to effectively control the period of stay of the materials in the furnace.

D. Apparatus of the type in which the materials to be treated are heated, melted and solidified in a vessel or a mold. In this case, measures have to be taken for the heat resistance and heat insulation of the vessel which is heated both by a heating source and the melt, and is not suitable for use in continuous or semi-continuous operation.

E. Apparatus of the type in which the surface area of the materials to be treated is molten and the melt is continuously discharged from the bottom of the heating chamber by the force of gravity. Apparatus of this type encounters a problem such that, since there is no pool of the melt, the period of stay of the materials to be treated tends to become short, resulting in insufficient melting and mixing.

F. Apparatus of the type in which the materials to be treated are heated and molten in an open heating chamber and, after the melting, the chamber is tilted to discharge the melt.

This apparatus permits a free adjustment of the staying period of the melt and can make sure the discharge of the melt. However, apparatus of this type encounters a difficulty in conducting the pouring under an airtight condition, and is not suitable for use in continuous or semi-continuous treatment.

Thus, all the known incinerating and melting apparatus involve their own problems.

On the other hand, the incinerating, melting and solidifying treatment of radioactive wastes requires that the melt can be safely taken out of the furnace without fail and that the series of treatment be conducted under an airtight condition, and there is a demand for development of apparatus which can satisfy such requirements.

SUMMARY

A first object of the present invention is to provide incinerating and melting apparatus in which the start and stop of pouring of melt can be conducted easily and without fail.

A second object of the invention is to provide incinerating and melting apparatus which permits a free adjustment of the period of stay of materials to be treated in the furnace.

A third object of the invention is to provide incinerating and melting apparatus in which a series of steps including incinerating, melting, pouring and solidification can be completed under an airtight condition.

A fourth object of the invention is to provide apparatus which is suitable for use in incinerating, melting and solidifying radioactive wastes.

THE DRAWINGS

FIG. 3 is a sectional view of the furnace body taken along the line I—I of FIG. 2;

FIG. 4 is a sectional view of a modified example of the furnace body;

FIGS. 5A, 5B, 5C and 5D are sectional side elevational views of the furnace body showing successive steps of operation;

FIG. 13 is a view, illustrating incinerating and melting process conducted by the apparatus of the invention.

THE PREFERRED EMBODIMENTS

The present invention will now be described in greater detail in connection with the preferred embodiments.

Figure 1:
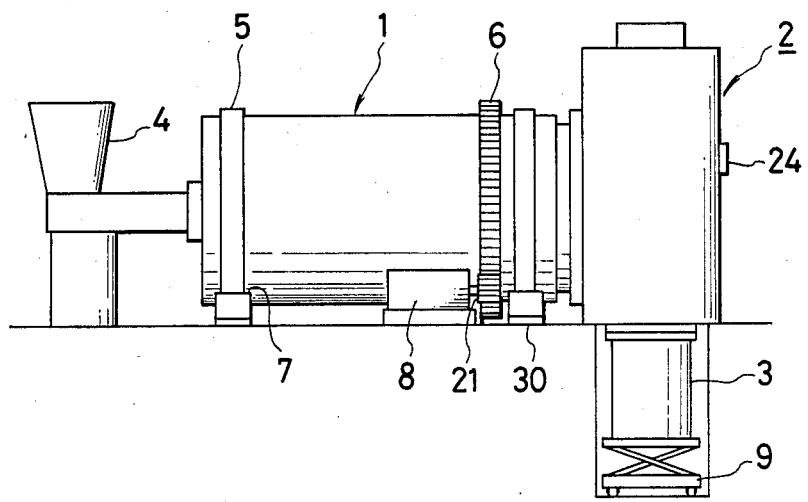
FIG. 1 is a side elevational view of incinerating and melting apparatus in accordance with a first embodiment of the present invention.
Figure 2:
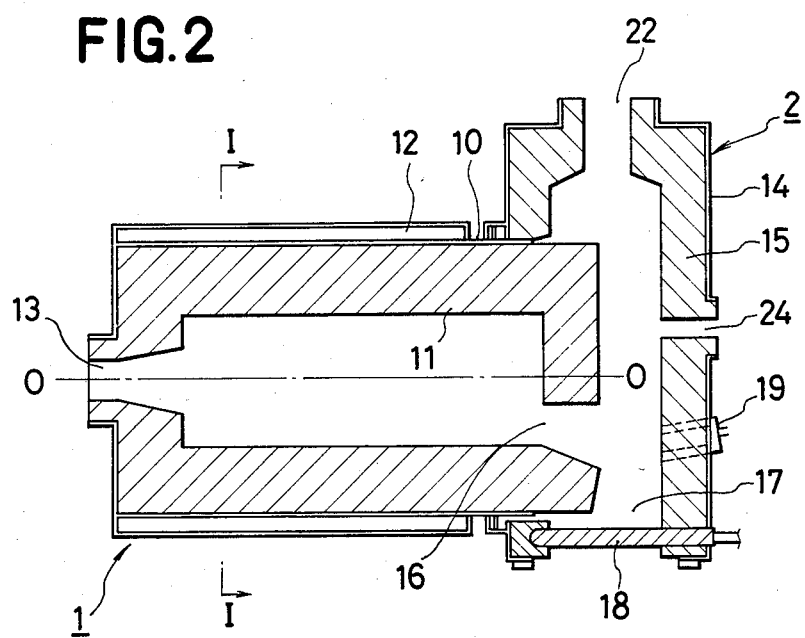
FIG. 2 is a sectional side elevational view of a furnace body and a hood incorporated in the first embodiment of the invention.

FIGS. 1 to 5A through 5D show a first embodiment of the incinerating and melting apparatus in accordance with the invention. This apparatus is composed mainly of a furnace body 1 and a hood 2 as shown in FIGS. 1 and 2.

The furnace body 1 is of a horizontal polygonal or cylindrical type, preferably horizontal cylindrical type.

As will be seen from FIG. 2, the furnace body 1 has a cylindrical metallic shell 10 which is covered by refractory and heat-insulating material 11. The furnace body 1 is arranged such that it can be forcibly cooled as desired.

The forcible cooling is conducted by means of cooling air or water, depending on the purpose for which the apparatus is used.

When the material to be treated contains any substance which generates hydrogen chloride when burnt, e.g., vinylchloride, there is a risk of corrosion of the shell 10 by the condensate of the hydrogen chloride. In such a case, the forcible cooling is preferably effected by air such that the shell temperature be maintained above 100° to 200° C. so as to prevent condensation of the hydrogen chloride and below 300° to 400° C. so as not to cause any reduction in the mechanical strength of the shell 10.

A melt discharge port 16 is provided in one end wall of the furnace body 1 at an eccentric position from the central axis O—O of the furnace body 1, while a material charging port 13 is formed in the other end wall.

The gas generated in the furnace body 1 is led towards the hood 2 through a flue. The flue may be constituted by the discharge port 16 as shown in FIG. 2 or, alternatively, a specific flue 25 is provided coaxially with the axis O—O separately from the discharge port 16.

As shown in FIG. 1, the furnace body 1 is mounted on a pair of rollers 7 provided on a bed 30, with its longitudinal axis held horizontally or at a slight inclination. The furnace body 1 may be rotatable.

A ring gear 6 provided on the outer periphery of the furnace body 1 meshes with a pinion 21 which is driven by a reversible motor 8 carried by the bed 30, so that the furnace body can be rotated in either direction.

The range of rotation angle of the furnace body 1 may be such as to allow the melt to be discharged through the discharge port 16 in the furnace body 1, and should be determined suitably according to the necessity.

As will be seen from FIGS. 3 and 4, a burner 20 for heating the material to be treated and a secondary air inlet 23 for incinerating the material are provided in the furnace body 1.

As will be seen from FIGS. 3 and 4, the burner 20 and the secondary air inlet 23 may be formed in the peripheral wall of the furnace body 1 or in the axial end wall of the same.

On the other hand, the hood 2 is stationary, and the inner wall of a metallic shell 14 thereof is lined with a refractory and heat insulating material 15.

A furnace body 1 fits in the hood 2 in a manner such that the rotation of the furnace body 1 is not hindered by the hood 2, and the fitting portion is hermetically sealed so as not to allow the gas generated in the furnace body 1 to escape outside through the fitting portion.

The hood 2 is provided with a burner 19 disposed so as to oppose the melt discharge port 16 in the furnace body. The hood 2 also is provided with a secondary air inlet 24.

The gas generated in the furnace body 1 is relieved through the melt discharge port 16 and is led to the outside of the apparatus through a flue 22 provided on the upper portion of the hood 2.

The gas discharged from the flue is sent to another waste gas treating equipment. When the gas generated in the furnace body contains combustible gases or combustible dusts, it is desirable that the hood 2 serves as a secondary comtustion chamber so that the gases and dusts are burnt secondarily by the heat from the burner 19 before they are discharged.

A melt sprue 17 constituting a passage for the melt is formed in the bottom of the hood 2. The sprue is selectively closed by a slide type damper 18 which is made of a refractory and heat-insulating material.

As shown in FIG. 1, a receiver 3 for receiving the melt is disposed so as to face the sprue 17. The receiver 3 is adapted to be lifted towards the hood 2 by known means such as a jack so as to be airtightly pressed against the hood 2 in communication with the sprue 17.

When the melt is to be cooled and solidified in the receiver 3, the receiver 3 is situated as described. When the cooling and solidification is to be made in a mold, the mold is situated in communication with the sprue 7 in place of the receiver 3. When a granulating solidification is to be conducted, a water tank is used in the same way as the receiver or the mold.

As shown in FIG. 1, the end of the furnace body having the material charging port 13 is connected to a material charger 4 in such a manner as not to impede the rotation of the furnace body 1. The material charger 4 may be of a known type such as a screw feeder type, pusher type and so forth.

The operation of the described first embodiment of the incinerating and melting apparatus of the invention will be described hereinunder with reference to FIGS. 5A to 5D.

As the first step, the furnace body 1 is rotated by the reversible motor 8 to such a rotational position at which the melt discharge port 16 is positioned above the melt M so as to prevent the melt M from flowing out of the furnace body 1, and the receiver 3 is brought into pressure contact with the bottom of the hood 2 in the manner described before.

Then, fire is set on the burner 20 and the material is continuously or intermittently put into the furnace body 1 through the material charging port 13 by means of the charger 4, so that the material is burnt and molten.

Meanwhile, the reversible motor 8 is operated in one and the other directions intermittently so as to swing the furnace body 1 reciprocatingly, thereby stirring the materials to be treated in the furnace body 1. This stirring ensures not only uniform heating of the materials but also uniform distribution of oxygen necessary for the burning of the materials, so that the materials can be burnt perfectly.

In addition, since the melt M is stirred, the materials to be treated can have a homogeneous structure after solidification through cooling.

The gas generated in the furnace body 1 is introduced into the hood 2 through the discharging port 16 serving as the flue or through a sprue 25 which is formed separately. In the case where the gas contains combustible geseous compnents or combustible dusts, they are burnt secondarily within the hood 2 under the assistance of the burner 19 before they are sent to another waste gas treating equipment through the flue 22.

After lapse of a predetermined heating time, the slide-type damper 18 is opened and the reversible motor 8 is operated so as to rotate the furnace body 1 to a position where the melt discharge port 16 comes below the level of the melt M. As a result, the melt M flows into the receiver 3 through the melt discharge port 16 and the sprue 17. Since the receiver 3 is held in an airtight contact with the sprue 17, the gas atmosphere in the hood 2 does not escape outside.

The melt discharge rate can be controlled by adjusting the position where the melt discharge port 16 opens in the melt M by a suitable control of rotation and stoppage of the furnace body 1. It is advisable that the portion of the furnace body 1 near the melt discharge port 16 is heated by means of a burner 19 so as to prevent any blockage of the melt discharge port 16 due to increase in the viscosity or solidification of the melt M around the discharge port 16.

After completion of pouring of a predetermined amount of the melt M, the furnace body 1 is rotated to a position at which the melt discharge port 16 is spaced away from the level of the melt M, thereby stopping the pouring of the melt as shown in FIG. 5C.

The burning and melting, pouring and stopping of pouring of the melt are repeated in the described manner. For replacing the receiver 3, the slide-type damper 18 is closed as shown in FIG. 5D so that the replacement is conducted without allowing the atmosphere in the hood 2 from communicating with the exterior.

Figure 6:
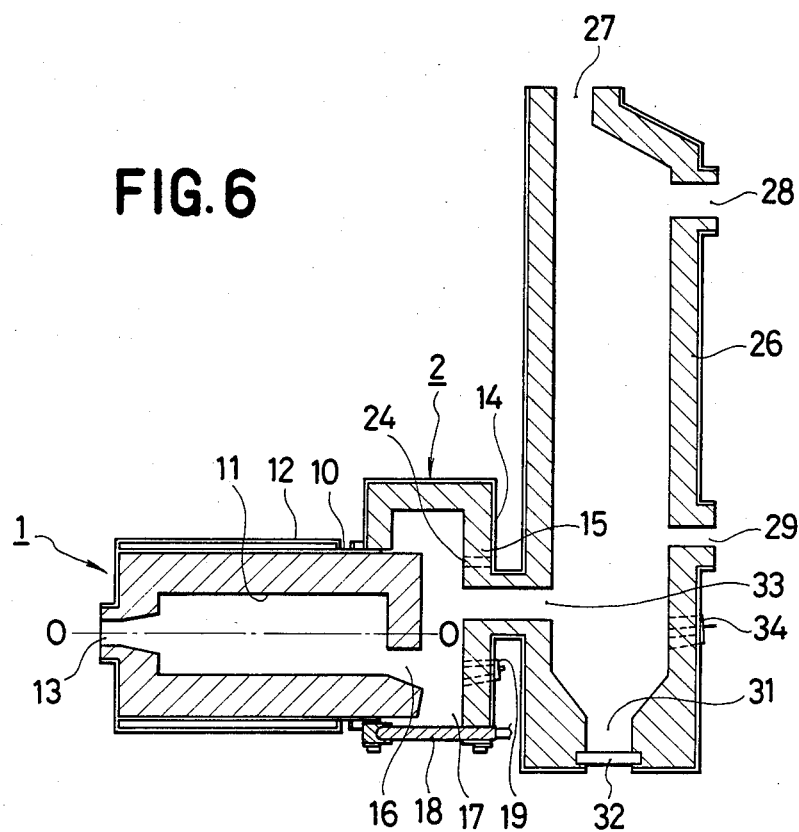
FIG. 6 is a sectional side elevational view of a second embodiment of the invention.
Figure 7:
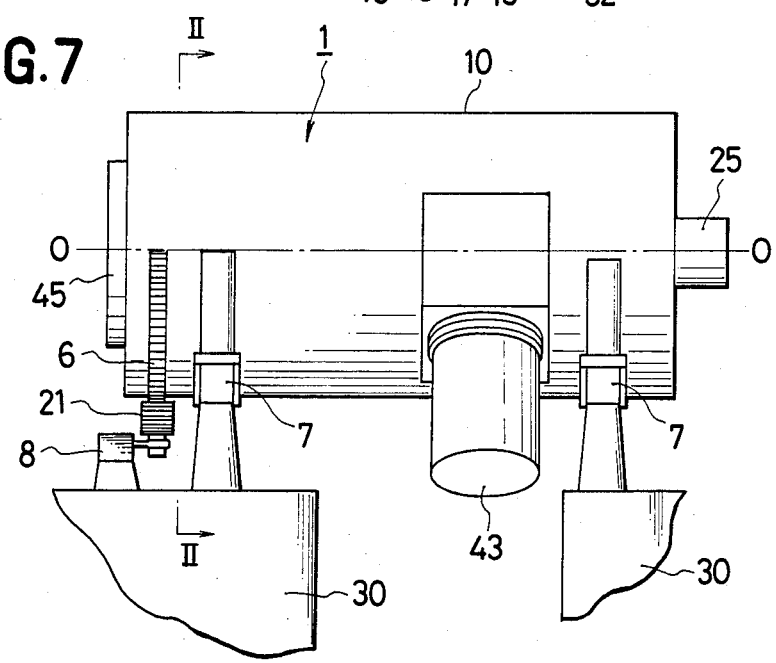
FIG. 7 is a side elevational view of a third embodiment of the invention.

FIG. 6 shows a second embodiment of the invention. In this embodiment, the hood 2 is connected to an incinerator 26 through a flue 33. In the incinerator 26, combustible materials are incinerated by the heat possessed by the hot waste gas from the furnace body 1.

A material charging port 27, a flue 28 and an ash discharge port 31 are formed in the incinerator 26, as well as a burner 34 for assisting the incineration and a secondary air inlet 29.

The incinerator 26 may be of a vertical type as shown in FIG. 6 or may be any of other known types such as fire grate type. This second embodiment offers the following advantages:

Incineration of combustible materials can be made at a comparatively low temperature but requires an ample internal volume of the furnace. Conversely, incineration and melting of incombustible or fire-retardant materials requires the materials to be heated to high tempratures, although the internal volume of the furnace may be small.

Therefore, a rational and efficient system is realized by arranging so that incombustible and fire-retardant materials are burnt and molten in the furnace body 1 and the gas generated in the furnace body 1 is introduced into the incinerator 26 having a large internal volume where the combustible materials are incinerated.

The incinerating and melting operation in the second embodiment is conducted in a manner which will be explained hereinunder.

A combustible material is put into the incinerator 26 through the material charging port 27 and is heated and incinerated by the heat of the hot gas generated in the furnace body 1 and introduced into the burning furnace through the flue 33.

When the temperature of the gas generated in the furnace body 1 is low as in the case of the start-up of the system, the burner 34 is operated to assist the burning in the incinerator 26.

The ash produced in the incinerator 26 is accumulated on the bottom of the incinerator 26 and is discharged through an ash discharge port 31 by means of a damper 32. Incombustible and fire-reatardant materials, as well as ash taken out of the incinerator 26, are charged into the furnace body 1 so that they are incinerated and molten in the same way as in the process explained in connection with the first embodiment.

A third embodiment of the invention will be explained hereinunder with reference to FIGS. 7 through 10.

In this third embodiment, the incinerating and melting apparatus is composed mainly of a furnace body 1 and a receiver 43 which is detachably secured to one side surface of the furnace body 1.

Figure 10:
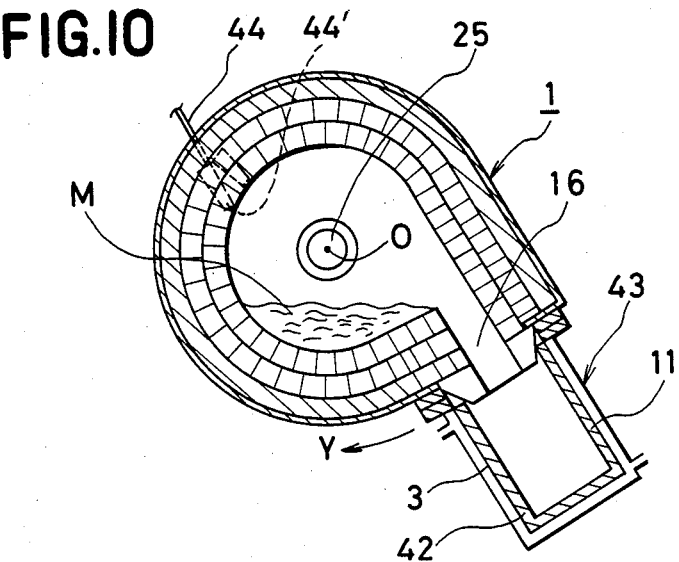
FIG. 10 is a sectional view illustrating the operation of the third embodiment.

As will be seen from FIG. 10, a melt discharge port 16 is opened in the side wall of the furnace body having a circular cross-section, such as to open in the tangential direction O—O. The receiver 43 for the melt M is detachably secured to the portion of the furnace body 1 where the melt discharge port 16 opens. The receiver 43 accommodates, for example, a drum can 3 which is lined on its inner peripheral surface with a refractory material 11 and is formed on its outer periphery with a cooling jacket 42 for circulation of a cooling medium such as air or water. The furnace body 1 is provided on one end thereof with a material charging port 13 having a lid 45 and on the other end thereof with a flue 25. The furnace body 1 is rotatably carried by a pair of rollers 7 on a machine bed 30, with its longitudinal axis held horizontally or at an inclination. A ring gear 6 provided on the outer peripheral surface of the furnace body 1 meshes with a pinion 21 connected to a reversible motor 8 mounted on the machine bed 30. As shown in FIG. 10, a burner 44 has a nozzle 44' which opens so as to substantially oppose the melt discharge port 16 formed in the wall of the furnace body 1.

The flue 25 is connected to a waste gas disposal system (not shown) which is capable of perfectly extinguishing toxic substances and dusts.

Incineration and melting of materials to be treated by the apparatus of this third embodiment are conducted in a manner which will be explained below. As the first step, the reversible motor 8 is operated in one direction so that furnace body 21 is rotated through the pinion 21 and the ring gear 6 to a position where the melt discharge port 16 is oriented vertically. After stopping the rotation of the furnace body 1, the receiver 43 accommodating a suitable container 3 such as a drum can is mounted on the portion of the furnace body 1 where the melt discharge port 16 opens.

Figure 8:
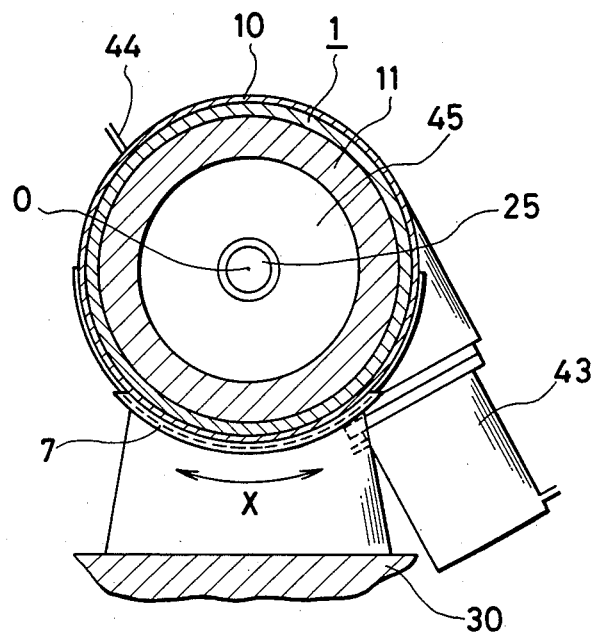
FIG. 8 is a sectional view taken along the line II—II of FIG. 7.
Figure 9:
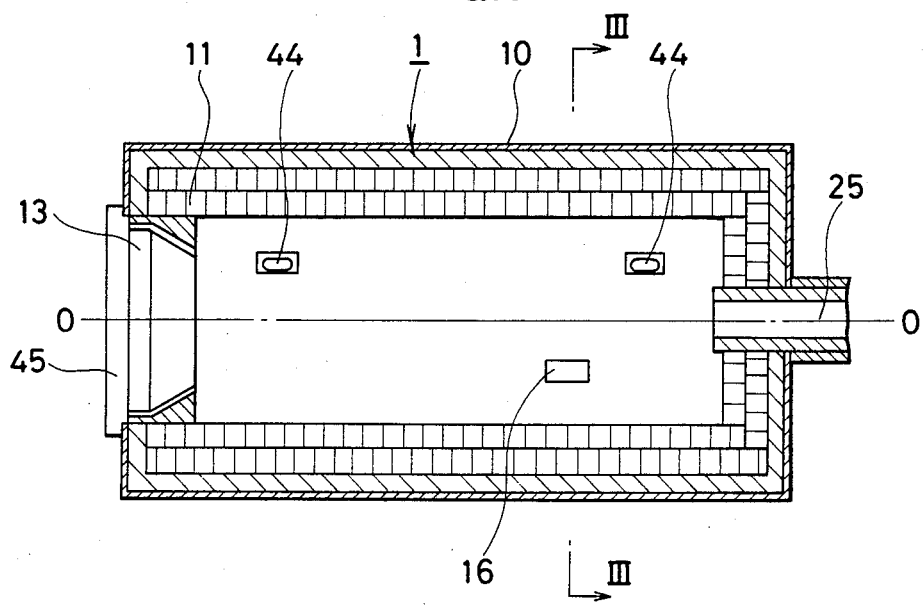
FIG. 9 is a sectional side elevational view of the furnace body incorporated in a third embodiment of the invention.

Then, the sense of rotation of the motor 8 is reversed so that the melt discharge port 16 is tilted as shown in FIG. 8 so as not to allow the escape of the content in the furnace body 1. Then, after removing the lid 45, materials to be treated are put in the furnace body 1 and, after closing the lid 45, fire is set on the burner 44 thereby commencing heating of the materials.

As a result of the heating, the temperature in the furnace is raised so that the combustible and fire-retardant materials are incinerated and reduced to ashes.

Meanwhile, the motor 8 is operated in both directions intermittently so as to oscillatorily swing the furnace body 1 about its axis O-O so as to stir the melt M, thereby uniformly distributing oxygen which is necessary for the incineration. The waste gas, dusts, noxious gas and unburnt combustible gas generated when the materials are burnt are brought into direct contact with the flame of a high temperature on the burner 44 so as to be sufficiently burnt in the furnace body 1 before they are sent to a waste gas disposal system. The combustion gas from the burner 44 swirls within the furnace body 1 so that the disposed materials are well ventilated. A part of the dusts generated is trapped within the furnace body 1 so that this system can be used very effectively also for the purpose of disposal of fire-retarding materials which tend to generate dusts and gases.

The slags formed as a result of incineration of the combustible or fire-retarding materials are further heated together with the incombustible materials so as to be molten together. After the completion of the melting, the motor 8 is driven so that the furnace body 1 shown in FIG. 10 is rotated in one direction thereby allowing the melt M to be discharged into the receiver 43 through the melt discharge port 16.

The pouring may be conducted after the completion of the melting of the materials or, alternatively, the furnace body 1 is progressively rotated in the direction of the arrow Y while continuing the heating so that the melt is successively discharged into the receiver 43 bit by bit.

Materials to be treated having extremely high melting temperatures such as metals and gravel may be introduced even in an unmolten state together with the melt M of other materials into the receiver 43. The unmolten materials are concealed or embedded in the solidified waste material solidified from the melt M without affecting the reducibility of the volume and the stability of the solidified waste.

After the completion of introduction of the melt M into the receiver 43, the heating is stopped and the melt is left for cooling without detaching the receiver 43 from the furnace body 1, thereby allowing the melt M to be solidified.

After the solidification of the melt M, the receiver 43 is detached from the furnace body 1 and the solidified waste is taken out of the receiver 43 together with the drum can 3. The drum can 3 is then closed by a suitable lid and stored in at a suitable storage place. In the third embodiment described above, only one melt discharge port 16 is provided. This, however, is not essential and the arrangement may be such that the furnace body 1 is provided with a plurality of melt discharge ports 16 in combination with corresponding receivers 43.

Figure 11:
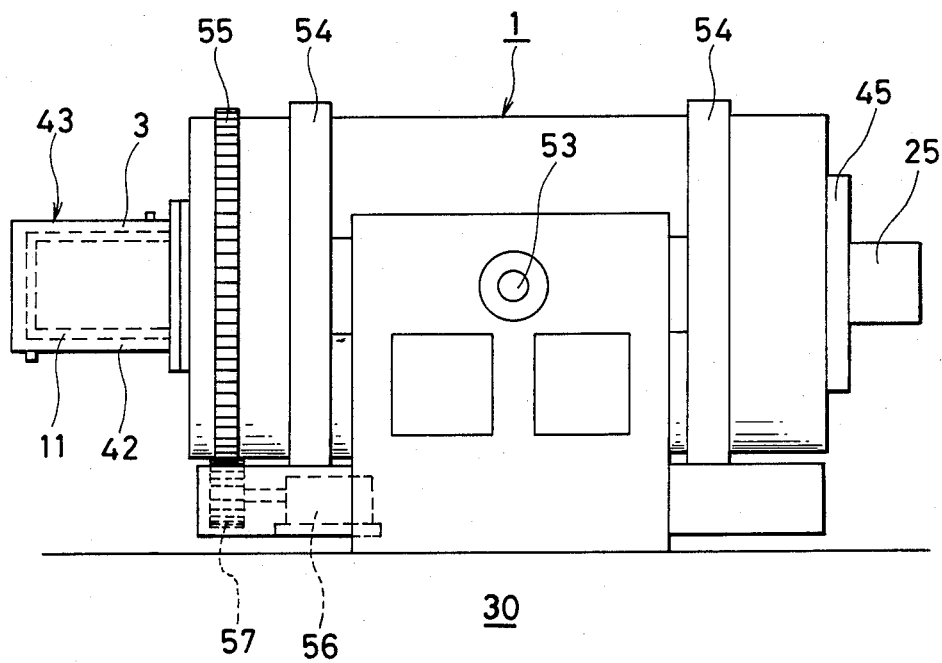
FIG. 11 is a side elevational view of a fourth embodiment of the invention.
Figure 12:
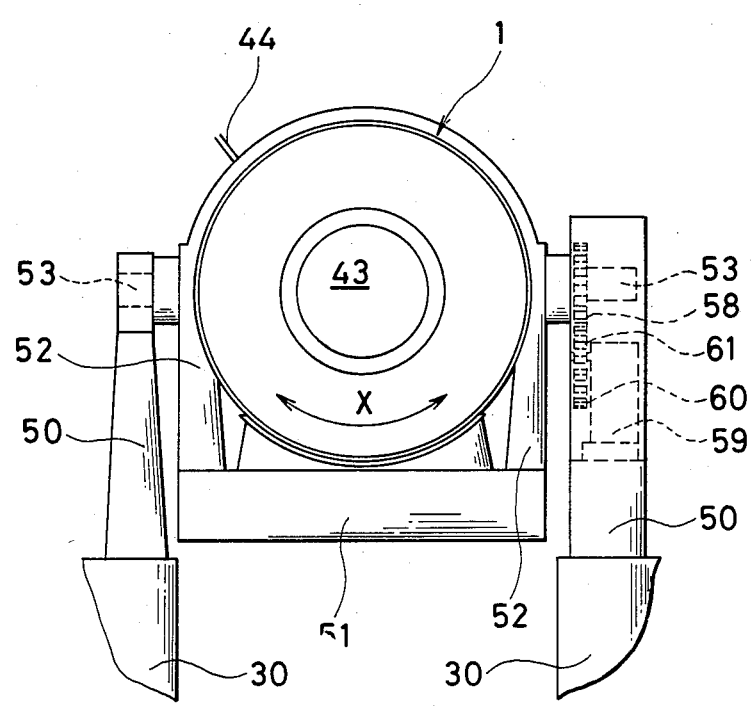
FIG. 12 is a left side end view of the apparatus shown in FIG. 11.

A fourth embodiment of the invention will now be described with reference to FIGS. 4, 11 and 12.

The furnace body 1 is supported by a bracket 52 on a support base 51. The bracket 52 is rotatably supported by a pair of trunnion shafts 53 on a pair of supporting bases 50 provided on the machine bed 30. The furnace body 1 is rotatably held on the support base 51 through the supporting bracket 54. A ring gear 55 on the outer peripheral surface of the furnace body 1 meshes with a pinion 57 connected to a reversible motor 56 so that the furnace body 1 can be driven to rotate oscillatorily in one and the other directions. A lid 45 having a flue 25 is attached to one end of the furnace body 1, while a receiver 3 is detachably attached to the other end of the receiver 3.

On the other hand, one of the trunnion shafts 53 carries a gear 58 which is drivingly connected through a gear train 61 to a gear 60 of a reversible motor 59 which is provided on the supporting base 50, so that the furnace body 1 can be tilted together with the supporting base 51 by the power of the motor 59.

In the operation of this embodiment, materials to be treated are charged into the furnace body 1 after removing the lid 45 and, after refitting the lid 45, fire is set in the burner 44 so as to heat and melt the materials. Meanwhile, the motor 56 is operated so that the furnace body is rotated in discretionary directions through the gear 57 and the gear sector 55. The waste gas is introduced from the flue 25 into a waste gas disposal system (not shown).

After the melting of the materials, the motor 59 is started so that the trunnion shaft 53 on the side bracket 52 is rotated through the gear 60, gear train 61 and the gear 58. As a result, the furnace body 1 is tilted together with the supporting base 51 so that the furnace body 1 is turned upright thereby allowing the melt M to flow into the receiver 43. After the solidification of the melt M, the receiver 43 is taken out of the furnace body 1.

First to fourth embodiments of incinerating and melting apparatus of the present invention have been described. In the incineration and melting of materials to be treated by the apparatus of the invention, waste gases containing combustible gases, noxious gases and dusts are generated.

When material to be treated is a radioactive pollutant, the burning and melting treatment is conducted at a high temperature so that the nuclides of a low boiling temperature and compounds thereof for example Cs, are evaporated to merge in waste gases. In consequence, these radioactive substances are accumulated in various devices and pipes.

An explanation will hereunder be made as to the method of treating waste gases with specific reference to FIG. 13, taking an instance of cases where the waste contains radioactive substances.

Combustible, fire-retarding and incombustible solids A and miscellaneous materials and packaging materials B are, either A alone or in the form of a mixture of A and B, put into the burning and melting apparatus C. Then, air and fuel are supplied to incinerate and melt the materials. The miscellaneous materials B are chopped into pieces as desired.

Hot gases generated in the furnace is sent to a secondary combustion chamber D such as the incinerator 26 shown in FIG. 6 for secondary burning, and the dusts in the secondary burning chamber D is blended with the ash E through the aid of an additive, and the blend is returned to the incinerating and melting device C. The waste gas discharged from the secondary combustion chamber D is made to contact a scrubbing liquid or a waste liquid G by a direct contact type scrubber F so that a portion of the waste gas is cooled and scrubbed at once. The scrubbing liquid may be city water or industrial water, or it may be devised to condensate the steam generated in the scrubber F and recycle the resulting water as the scrubbing liquid. The waste liquid G is a washing waste water, drain water or a condensed liquid thereof discharged from installation for treating radioactive substances, and is a radioactive waste.

As a result of the cooling-scrubbing, the components in the waste gas are absorbed in a scrubbing liquid or the waste liquid while the liquid is concentrated.

The concentrated scrubbing liquid is returned through a recovery tank H to the incinerating and melting apparatus C via a recovery liquid tank H after blending with the ash E.

On the other hand, the waste gas from the scrubber F is sent to a scrubbing tower I and is scrubbed by condensate obtained as a result of cooling of the waste gas. The scrubbing liquid is returned to the scrubber F.

There is a risk that the condensate is made acidic due to the residual $SO_x$ components, resulting in a reduction in the absorption efficiency of the $SO_x$. In order to prevent this problem and also in order to control the pH value of the direct contact type scrubber F, at least a member of hydroxides or carbonates of Na, K, Mg, Ca or the like is added to the condensate as a neutralizer.

The waste gas coming out of the scrubbing tower I is heated slightly in order to avoid condensation of water and is then passed through a filter unit J where residual dusts are removed completely. The gas is then discharged to the atmosphere through a monitoring balance K of radioactivity and noxious components.

On the other hand, materials which have been incinerated and molten by the incinerating and melting apparatus C of the first to fourth embodiments and received and solidfied in the receiver 3 are stored in a storage tank through the monitoring balance N.

The incinerating and melting apparatus of the invention offers the following remarkable advantages:

(1) The furnace body of the incinerating and melting apparatus of the invention is provided with the melt discharge port formed at a portion thereof eccentric from the axis of the furnace body, and is rotatably mounted. Therefore, it is possible to easily and safely start and stop the pouring of the melt and to control the pouring rate by selectively rotating and stopping the furnace body.

(2) The start and stop of pouring is conducted without being affected by the amount of residual melt in the furnace body, so that the period of stay of materials to be treated in the furnace can be freely adjusted.

(3) As stated in paragraph (1) above, the melt discharge port is positioned at an eccentric position so that the melt does not come out of the furnace body when it is oscillated or rocked, provided that the discharge port is directed upwardly. The pouring of the melt towards the hood can be easily conducted simply by orienting the melt discharge port downwardly.

(4) Since the furnace body is rotatably supported materials to be treated in the furnace body can be stirred effectively so as to ensure an efficient heating and a good condition of ventilation, thereby assuring a high efficiency of the incineration of the materials.

(5) The rocking or rotating motion of the furnace body permits effective stirring and blending of the melt so as to provide a higher melting speed and uniform blending. On the other hand, degassing of the melt is promoted so as to assure a homogeneous and fine structure of solidified materials.

(6) A receiver in which the melt is to be cooled and solidified is replaceably attached to the melt discharge port on the furnace body or to the hood provided on the discharge side of the furnace body, so as to permit the series of steps from heating to the solidification of the melt to be conducted completely under airtight conditions. This affords an advantage particularly when the materials to be treated are radioactive in that the radioactive nuclides are confined in the airtight system without escaping outside, although a small part of the nuclides may be transferred in the form of vapor or dusts to the waste gas which is to be supplied through the flue to a waste gas disposal system where such radioactive nuclides are safely disposed of.

We claim:

1. A rotary incinerating and melting apparatus comprising a cylindrical or polygonal horizontal furnace body, driving means for rotating the furnace body is both directions of rotation about a longitudinal axis thereof of burning means, wherein the furnace body has a material charging port formed in a longitudinal end wall thereof and a melt discharge port formed in the other longitudinal end wall thereof at an eccentric position from said longitudinal axis and wherein a hood provided with a flue is disposed on the side of said melt discharge port of the furnace body, said furnace body being rotatably fitted in said hood, the melt discharge port being opened in the interior of said hood, a melt receiver being removably and sealably mounted to the bottom of said hood.

2. A rotary incinerating and melting apparatus as claimed in claim 1, wherein said hood is provided with secondary burning means.

3. A rotary incinerating and melting apparatus as claimed in claim 1 further comprising an incinerator being connected to said hood through said flue.

4. A rotary incinerating and melting apparatus as claimed in claim 3, wherein said hood is provided with secondary burning means.

5. A rotary incinerating and melting apparatus as claimed in claim 4, wherein said melt receiver is provided with a cooling jacket.

6. A rotary incinerating and melting apparatus as claimed in claim 3, wherein said incinerator is provided with an air inlet.

7. A rotary incinerating and melting apparatus as claimed in claim 3, wherein said incinerator is provided with secondary burning means.

8. A rotary incinerating and melting apparatus as claimed in claim 3, wherein said incinerator is provided with a material charging port.

9. A rotary incinerating and melting apparatus as claimed in claim 3, wherein said incinerator is provided with an ash discharge port.

10. A rotary incinerating and melting apparatus as claimed in claim 3, wherein said incinerator is provided with a flue.

11. A rotary incinerating and melting apparatus comprising a cylindrical or polygonal horizontal furnace body, driving means for rotating the furnace body in both directions of rotation about a longitudinal axis thereof, and burning means, wherein the furnace body has a material charging port formed in a longitudinal end wall thereof, a flue formed in the other longitudinal end wall thereof and a melt discharge port opened in the side wall of said furnace body and wherein a melt receiver is removably and sealably mounted to the furnace body in communication with said melt discharge port in the tangential direction of the furnace body.

12. A rotary incinerating and melting apparatus as claimed in claim 11, wherein said melt receiver is provided with a cooling jacket.

13. A rotary incinerating and melting apparatus comprising a cylindrical or polygonal horizontal furnace body, driving means for rotating the furnace body on a supporting base in both directions of rotation about a longitudinal axis of the furnace body, said supporting base being mounted on supporting brackets; driving means for tilting the furnace body on said supporting base in longitudinal directions of the furnace body, and burning means, wherein said furnace body is provided through a longitudinal end wall thereof with a flue and wherein a melt receiver is removably sealably mounted on the other end wall thereof.

* * * * *